Figure 1:
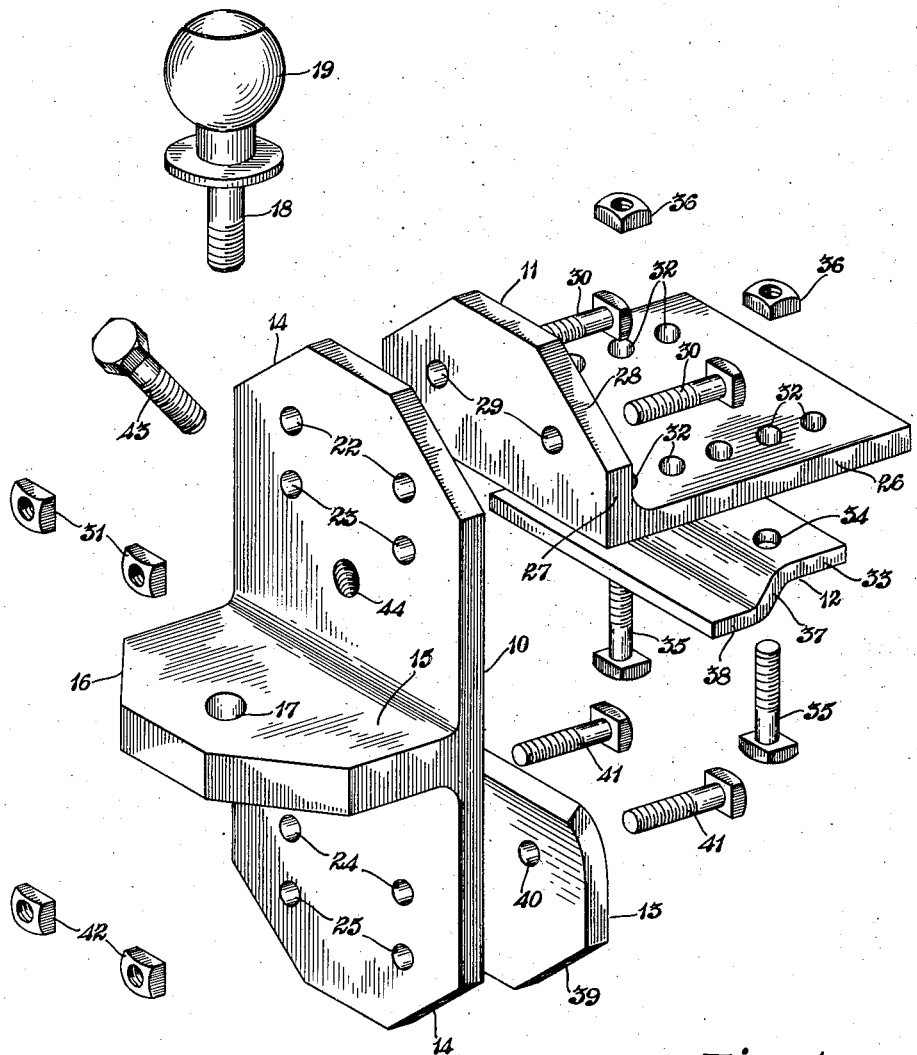

Oct. 25, 1949.    H. P. HUGHES    2,486,161
TRAILER HITCH
Filed May 9, 1947    2 Sheets-Sheet 1

Inventor
Harold P. Hughes

By Frease and Bishop
Attorneys

Oct. 25, 1949.   H. P. HUGHES   2,486,161
TRAILER HITCH
Filed May 9, 1947   2 Sheets-Sheet 2
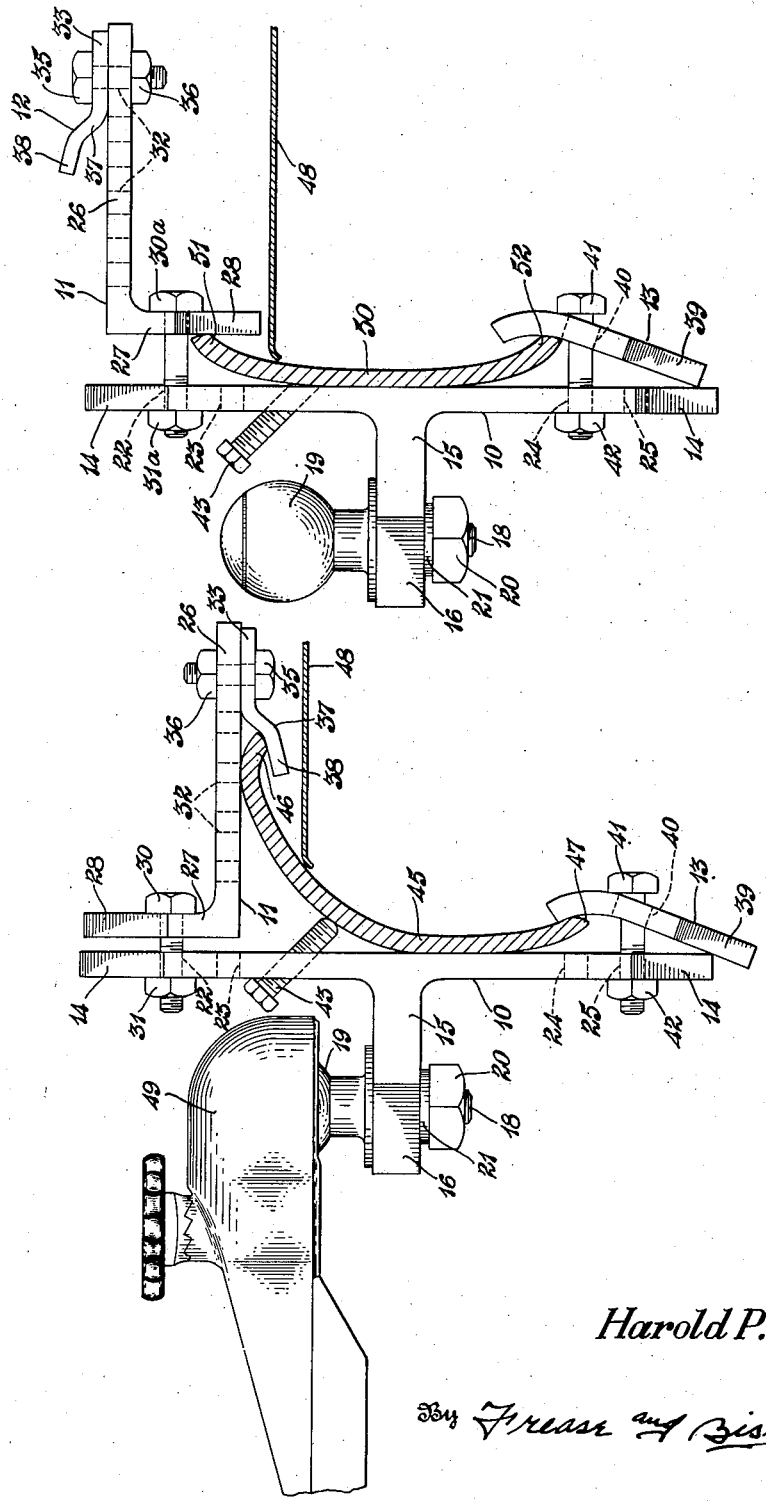
Inventor
*Harold P. Hughes*
By Frease and Bisley
Attorneys Patented Oct. 25, 1949

2,486,161

UNITED STATES PATENT OFFICE 2,486,161

TRAILER HITCH

Harold P. Hughes, Canton, Ohio

Application May 9, 1947, Serial No. 746,959

9 Claims. (Cl. 280—33.44)

1

The invention relates to trailer hitches and more particularly to such a device adapted to be connected to the rear bumper of an automobile or other draft vehicle to enable a trailer or the like to be connected thereto.

Various devices have been used in the past for coupling trailers to automobiles but such devices have been designed to be connected to the style of bumper which has been generally used for years and which is nearly flat in cross section.

A great many of the modern automobiles have adopted new styles of bumpers which are so shaped in cross section that the upper portion of the bumper is inclined, curved or extended forwardly so that the upper edge of the bumper is located in a vertical plane considerably forward of the lower edge thereof.

Also a considerable number of the more modern automobiles have a gravel pan or apron extending rearwardly from the back of the automobile body to a point adjacent to the bumper. This change in the cross sectional shape of the bumper makes it impossible to connect the conventional form of trailer hitches now in general use to the bumpers of modern automobiles.

Furthermore, since some of the trailer hitches now in use include means extending across the inner or forward side of the bumper, the location of the gravel pan or apron adjacent to the bumper prevents the use of such trailer hitches upon automobiles provided with these gravel pans or aprons.

It is therefore an object of the present invention to provide a trailer hitch for automobiles especially designed to be attached to these modern shapes of automobile bumpers.

Another object is to provide a trailer hitch so constructed that it may be quickly and easily attached to the rear bumper of an automobile provided with a gravel pan or apron located adjacent to the rear bumper.

A further object is to provide a trailer hitch of the character referred to which is equally applicable to the older form of bumpers which are substantially flat and vertically disposed in cross section.

A still further object is to provide a trailer hitch of this character having a forwardly extending member at its upper end adapted to extend over the rearwardly disposed upper edge of a bumper and provided with an adjustable clamping plate for engaging the forwardly disposed upper end portion of the bumper.

Another object of the invention is to provide a trailer hitch of this type including a vertically

2 disposed hitch plate for engaging the rear side of the bumper, adjustable clamping plates upon the hitch plate for engaging over the upper and lower edges of the bumper and an adjusting screw located through the hitch plate for contact with the rear surface of the bumper to adjust the hitch plate in vertical position.

A further object is to provide a trailer hitch of the character referred to in which the hitch plate is provided intermediate its ends with a horizontally disposed ear or flange upon which may be mounted a ball or other coupling member to cooperate with a socket or other coupling member mounted upon the tongue of the trailer.

A still further object of the invention is to provide a trailer hitch constructed in the manner above referred to in which a forwardly extending angular member at the upper end of the hitch plate is detachably connected to the hitch plate so that it may be reversed in position to accommodate the older type of bumpers which are substantially flat in cross section.

Other objects of the invention are to generally improve and simplify trailer hitches of this general character and to provide a trailer hitch which is flexible in use and easily adjusted to meet various conditions.

The above objects together with others which will be apparent from the drawings and following description, or which may be later referred to, may be attained by constructing the improved trailer hitch in the manner hereinafter described in detail and illustrated in the accompanying drawings, in which;

Figure 1 is an exploded view of a trailer hitch embodying the invention;

Fig. 2 a transverse vertical sectional view through a modern type of rear bumper with forwardly inclined upper portion showing the improved trailer hitch attached thereto; and, Fig. 3 a similar view showing the manner in which the improved trailer hitch may be attached to the older type of bumper which is substantially flat in cross section.

The trailer hitch to which the invention pertains includes generally the hitch plate 10, the upper angular member 11, having the clamping plate 12 adjustably mounted thereon, and the lower clamping plate 13. All of these plates may be in the form of malleable castings, forgings or may be otherwise constructed so as to be of sufficient strength for the purpose for which the device is intended.

The hitch plate indicated generally at 10 may be of sufficient height so that it will extend some distance above and below the upper and lower edges respectively of the rear bumper to which the trailer is to be attached, and may be of any suitable width.

The upper and lower edges of the hitch plate are preferably tapered or bevelled as indicated at 14 or otherwise shaped to eliminate sharp corners. Midway between the upper and lower ends of the hitch plate 10 is formed a rearwardly disposed ear or flange 15 which may be of greater thickness than the body of the hitch plate 10 and the rear end of which may be tapered or bevelled as indicated at 16.

A central opening 17 is formed in the ear 15 to receive the screw threaded stem 18 of a coupling member such as the conventional ball 19 which is rigidly attached to the ear 15 as by the nut 20 and lock washer 21.

Two or more vertically spaced pairs of openings, as indicated at 22 and 23, are formed in the upper portion of the hitch plate 10 and two similar vertically spaced pairs of openings 24 and 25 are formed in the lower portion thereof.

The upper angular member 11 is in the form of a horizontally disposed plate 26 having the vertically disposed angular flange 27 at its rear end which may be tapered or bevelled as indicated at 28 to conform to the contour of the upper end of the hitch plate.

A pair of apertures 29 is formed in the vertical flange 27 to receive the attaching bolts 30 which may be selectively located through the apertures 22 and 23 in the hitch plate as desired in order to adjustably mount the member 11 upon the forward side of the hitch plate, nuts 31 being provided for the bolts 30 in order to tightly clamp the vertical flange 27 of the member 11 against the forward side of the hitch plate in adjusted position.

A plurality of spaced pairs of apertures 32 are formed in the horizontal plate 26 at points near the side edges thereof for adjustably connecting the upper clamping plate 12 thereto as will be later described.

This clamping plate 12 includes the flat forward portion 33 having a pair of apertures 34 therein for receiving the bolts 35 which may be located through any desired pair of the apertures 32 in the plate 26 and provided with the nuts 36 for adjustably clamping the plate 12 upon the plate 26.

The clamping plate 12 is then curved downwardly as indicated at 37 and then rearwardly as at 38 for clamping the upper edge portion of a bumper against the plate 26 as will be later described.

The lower clamping plate 13 may be slightly curved from top to bottom as shown in the drawings, the lower end thereof being tapered or bevelled as indicated at 39 to conform to the shape of the lower end of the hitch plate and a spaced pair of apertures 40 is provided in the lower clamping plate to receive the bolts 41 which may be located through the apertures 24 or 25 of the hitch plate to adjustably mount the clamping plate 13 thereon. Nuts 42 are provided upon the bolts 41 for clamping the lower edge of a bumper between the hitch plate and the clamping plate 13.

For the purpose of adjusting the hitch plate vertically against the rear side of an automobile bumper, the adjusting screw 43 may be located through the inclined threaded opening 44 in the hitch plate for contact with the rear surface of the bumper as will be later described.

As shown in Fig. 2 the improved hitch is especially designed to be easily and readily attached to the modern type of bumper, which is indicated in cross section at 45. It will be seen that the upper portion of this bumper is inclined forwardly so that the upper edge 46 thereof is located in a plane considerably forward of the lower edge 47.

As above pointed out the type of trailer hitch at present in common use was designed for attachment to the old fashioned type of bumper which is substantially flat, the upper and lower edges thereof being located in substantially the same vertical plane, and such trailer hitches are not adapted for use upon the modern type of bumpers, an example of which is shown at 45.

Furthermore many of the modern automobiles are provided with a rearwardly extending gravel pan or apron, as indicated at 48 in Fig. 2, located near the upper edge of the bumper and extending to a point adjacent thereto as shown in the drawings. This gravel pan prevents the use of many of the types of trailer hitches in which a plate, bar or other member is located across the inner or front side of the bumper to attach the hitch plate.

As shown in Fig. 2 the improved trailer hitch not only accommodates the modern type of bumper, in which the upper portion is extended forwardly so that the upper edge is located in a vertical plane considerably forward from the lower edge, but is also adapted to securely attach the hitch plate to the bumper without interference from the gravel pan or apron 48.

To attach the hitch plate 10 to the bumper 45 the hitch plate is placed against the back of the bumper in vertical position and the lower clamping plate 13 and the upper angular member 11 are first adjusted vertically on the hitch plate by locating the bolts 41 and 30 respectively through the proper openings 24 or 25 at the bottom and 22 or 23 at the top of the hitch plate respectively to accommodate the size and shape of the particular bumper to which it is applied, and the nuts are left loose on these bolts at this time.

The upper clamping plate 12 is then adjusted upon the horizontal flange 26 of the angular member 11 by locating the bolts 35 through the desired openings 32, to locate the clamping plate 12 at the required adjustment relative to the upper end 46 of the bumper and the nuts 36 are tightened on the bolts 35 to rigidly connect the locking plate 12 to the flange 26 with the forwardly extending portion 38 of the locking plate engaged under the edge 46 of the bumper.

Then the adjusting screw 43 is adjusted against the back surface of the bumper to position the hitch plate vertically. The nuts upon the bolts 30 and 41 are then tightened drawing the upper and lower clamping plates 12 and 13 respectively tightly against the upper and lower edge portions of the bumper so that the hitch plate is tightly clamped upon the bumper in vertical position as shown in Fig. 2.

The hitch plate 10 is thus rigidly connected to the bumper and in order to couple a trailer thereto the socket 49, which is permanently attached to the tongue of the trailer as in ordinary practice, is engaged with the ball 19 upon the hitch plate.

Although the improved trailer hitch to which the invention pertains is especially designed for use upon the modern type of bumper as above set forth in detail, it may be also quickly and easily attached to the older type of bumpers which are substantially flat in cross section and the upper and lower edges of which are located in substantially the same vertical plane.

This is especially desirable in a business establishment where trailers are rented for attachment to the customers' cars and and where it is necessary that the trailers be quickly connected to all types and shapes of bumpers so it is not necessary for such an establishment to be equipped with more than the one type of trailer hitch disclosed herein for all types of bumpers.

In Fig. 3 is shown the manner in which the improved trailer hitch may be attached to the old style of bumper indicated generally at 50. Such bumpers are substantially flat in cross section usually having a slight curvature as shown in Fig. 3 and the upper and lower edges 51 and 52 respectively thereof are both located in substantially the same vertical plane.

To attach the improved trailer hitch to a bumper of this type the proper adjustment is made upon the lower clamping plate 13 and the same is tightly clamped against the lower edge portion of the bumper by tightening the nuts 42 upon the bolts 41.

The upper angular member 11 is inverted as shown in Fig. 3 so that the vertical flange 27 thereof extends downward and this member is so adjusted by locating the bolts 30a through the proper aperatures 22 or 23 in the upper portion of the hitch plate 10 that the upper edge portion 51 of the bumper 50 will be received between the depending flange 27 and the hitch plate and will be tightly clamped therebetween by tightening the nuts 31a upon the bolts 30a. In this case the bolts 30a should be slightly longer than the bolts 30 shown in Figs. 1 and 2.

The upper clamping plate 10 has no function when the device is used in this manner. It will be seen that even though a gravel pan or apron 48 may be associated with this type of bumper this will not interfere with attaching the improved trailer hitch in the manner shown in Fig. 3 and above described.

In using the trailer hitch upon some old style bumpers of this general type it may not be necessary to use the adjusting screw 43 in order to adjust the hitch plate 10 in vertical position, and in such cases this screw may be removed so that it will not be lost.

From the above it will be obvious that a trailer hitch is provided which may be easily and readily attached to any type of automobile bumper now in use and upon modern automobiles provided with a gravel pan or apron located adjacent to the upper portion of the bumper.

I claim:

1. A trailer hitch for attachment to the rear bumper of a draft vehicle for supporting a coupling member for cooperation with another coupling member on the tongue of a trailer, and comprising a flat hitch plate for mounting in vertical position against the rear surface of the bumper, a lower clamping plate upon the hitch plate for clamping the lower edge portion of the bumper against the hitch plate, an angular member having a vertical flange adjustably connected to the upper portion of the hitch plate upon the front side thereof and having a forwardly disposed substantially horizontal flange extending over the top of the bumper and an upper clamping plate adjustably mounted upon said forwardly disposed flange for clamping the upper edge portion of the bumper against said forwardly disposed flange.

2. A trailer hitch for attachment to the rear bumper of a draft vehicle for supporting a coupling member for cooperation with another coupling member on the tongue of a trailer, and comprising a flat hitch plate for mounting in vertical position against the rear surface of the bumper, a rearwardly disposed ear upon the hitch plate for supporting one of the coupling members, a lower clamping plate adjustably mounted upon the front side of the hitch plate for clamping the lower edge portion of the bumper against the hitch plate, an angular member having a vertical flange adjustably connected to the upper portion of the hitch plate upon the front side thereof and having a forwardly disposed substantially horizontal flange extending over the top of the bumper and an upper clamping plate adjustably mounted upon the said forwardly disposed flange for clamping the upper edge portion of the bumper against said forwardly disposed flange.

3. A trailer hitch for attachment to the rear bumper of a draft vehicle for supporting a coupling member for cooperation with another coupling member on the tongue of a trailer, and comprising a flat hitch plate for mounting in vertical position against the rear surface of the bumper, a rearwardly disposed ear intermediate the ends of the hitch plate for supporting one of the coupling members, a lower clamping plate adjustably mounted upon the front side of the hitch plate for clamping the lower edge portion of the bumper against the hitch plate, an angular member having a vertical flange adjustably connected to the upper portion of the hitch plate upon the front side thereof and having a forwardly disposed substantially horizontal flange extending over the top of the bumper and an upper clamping plate adjustably connected to said forwardly disposed flange for clamping the upper edge portion of the bumper against said forwardly disposed flange.

4. A trailer hitch for attachment to the rear bumper of a draft vehicle for supporting a coupling member for cooperation with another coupling member on the tongue of a trailer, and comprising a flat hitch plate for mounting in vertical position against the rear surface of the bumper, a lower clamping plate upon the front side of the hitch plate for clamping the lower edge portion of the bumper against the hitch plate, means for adjustably mounting the lower clamping plate upon the hitch plate, an angular member having a vertical flange adjustably connected to the upper portion of the hitch plate and having a forwardly disposed substantially horizontal flange extending over the top of the bumper and an upper clamping plate adjustably connected to said forwardly disposed flange for clamping the upper edge portion of the bumper against said forwardly disposed flange.

5. A trailer hitch for attachment to the rear bumper of a draft vehicle for supporting a coupling member for cooperation with another coupling member on the tongue of a trailer, and comprising a flat hitch plate for mounting in vertical position against the rear surface of the bumper, a lower clamping plate adjustably mounted upon the front side of the hitch plate for clamping the lower edge portion of the bumper against the hitch plate, an angular member having a vertical flange and a forwardly disposed substantially horizontal flange extending over the top of the bumper, means for adjustably connecting the vertical flange to the hitch plate, and an upper clamping plate detachably mounted upon said forwardly disposed flange for clamping the upper edge portion of the bumper against said forwardly disposed flange and a rearwardly disposed ear intermediate the ends of the hitch plate for supporting one of the coupling members.

6. A trailer hitch for attachment to the rear bumper of a draft vehicle for supporting a coupling member for cooperation with another coupling member on the tongue of a trailer, and comprising a flat hitch plate for mounting in vertical position against the rear surface of the bumper, a lower clamping plate upon the front side of the hitch plate for clamping the lower edge portion of the bumper against the hitch plate, means for adjustably mounting the lower clamping plate upon the hitch plate, an angular member having a vertical flange and a forwardly disposed substantially horizontal flange extending over the top of the bumper, means for adjustably connecting the vertical flange to the hitch plate, and an upper clamping plate adjustably mounted upon said forwardly disposed flange for clamping the upper edge portion of the bumper against said forwardly disposed flange.

7. A trailer hitch for attachment to the rear bumper of a draft vehicle for supporting a coupling member for cooperation with another coupling member on the tongue of a trailer, and comprising a flat hitch plate for mounting in vertical position against the rear surface of the bumper, a rearwardly disposed ear upon the hitch plate for supporting one of the coupling members, a lower clamping plate, means including bolts and nuts for adjustably mounting said clamping plate upon the lower portion of the hitch plate to clamp the lower edge portion of the bumper therebetween, an angular member comprising a vertical flange and a forwardly disposed, substantially horizontal flange, means including bolts and nuts for adjustably mounting the vertical flange of the angular member upon the upper portion of the hitch plate, said forwardly disposed flange extending over the top of the bumper, an upper clamping plate, and means including bolts and nuts for adjustably mounting said upper clamping plate upon said forwardly disposed flange for clamping the upper edge portion of the bumper therebetween.

8. A trailer hitch for attachment to the rear bumper of a draft vehicle for supporting a coupling member for cooperation with another coupling member on the tongue of a trailer, and comprising a hitch plate for mounting in vertical position against the rear surface of the bumper, a lower clamping plate upon the hitch plate for clamping the lower edge portion of the bumper against the hitch plate, an angular member connected to the upper portion of the hitch plate and having a forwardly disposed substantially horizontal flange extending over the top of the bumper and an upper clamping plate for clamping the upper edge portion of the bumper against said forwardly disposed flange, and an adjusting screw located through the hitch plate for contact with the bumper for adjusting the hitch plate to vertical position.

9. A trailer hitch for attachment to the rear bumper of a draft vehicle for supporting a coupling member for cooperation with another coupling member on the tongue of a trailer, and comprising a hitch plate for mounting in vertical position against the rear surface of the bumper, a rearwardly disposed ear upon the hitch plate for supporting one of the coupling members, a lower clamping plate, means including bolts and nuts for adjustably mounting said clamping plate upon the lower portion of the hitch plate to clamp the lower edge portion of the bumper therebetween, an angular member comprising a vertical flange and a forwardly disposed, substantially horizontal flange, means including bolts and nuts for adjustably mounting the angular member upon the upper portion of the hitch plate, said forwardly disposed flange extending over the top of the bumper, an upper clamping plate, and means including bolts and nuts for adjustably mounting said upper clamping plate upon said forwardly disposed flange for clamping the upper edge portion of the bumper therebetween, and an adjusting screw located through the hitch plate for contact with the bumper for adjusting the hitch plate to vertical position.

HAROLD P. HUGHES.

REFERENCES CITED

The following references are of record in the file of this patent:

UNITED STATES PATENTS

| Number | Name | Date |
| --- | --- | --- |
| 2,195,611 | Brown | Apr. 2, 1940 |
| 2,306,007 | Thorp | Dec. 22, 1942 |
| 2,360,643 | Bixel | Oct. 17, 1944 |